United States Patent [19]
> Kawashima et al.

[11] 3,710,183
[45] Jan. 9, 1973

[54] FLASHER FOR VEHICLES
[75] Inventors: Yoshichi Kawashima, Gifu-shi; Hisami Mitsueda, Mie-gun, both of Japan
[73] Assignee: Nippon Denso Kabushiki Kaisha, Kariya-shi, Japan
[22] Filed: Aug. 4, 1969
[21] Appl. No.: 847,023

[30] Foreign Application Priority Data
Sept. 12, 1968 Japan ................................. 43/65966

[52] U.S. Cl. ................................. 315/209, 315/210
[51] Int. Cl. .............................................. H05b 37/02
[58] Field of Search ........ 315/209, 210, 77, 200, 225; 340/81

[56] References Cited
UNITED STATES PATENTS

| | | | |
|---|---|---|---|
| 3,329,868 | 7/1967 | Domann et al. | 315/210 X |
| 3,002,127 | 9/1961 | Grontkowski | 315/77 |
| 3,452,248 | 6/1969 | Leeder, Jr. | 315/77 |

Primary Examiner—Nathan Kaufman
Attorney—Cushman, Darby & Cushman

[57] ABSTRACT

A flasher for vehicles wherein a transistor switching circuit is driven by the output from a transistor adapted to conduct upon closure of a flasher lamp change-over switch or all-lamp (hazard-warning) flasher switch, the output from said switching circuit energizing an exciting coil to close a normally-open contact, and flasher lamps are turned on with a lamp current conducted thereto through said normally-open contact, a resistor and said flasher lamp change-over switch or all-lamp (hazard-warning) flasher switch. The value of said lamp current is then detected by the voltage drop across said resistor which in turn provides a bias voltage between the base and emitter of said transistor, and a current conduction time limiting circuit is further provided for determining the duration of current supply to said flasher lamps by a charging time constant of two resistors and a capacitor such that the operation of said transistor switching circuit is discontinued by the output from said conduction time limiting circuit to de-energize the exciting coil and cause the flasher lamps to go off for a period of time which is determined by the discharging time constant of the one of the two resistors and capacitor in said conduction time limiting circuit. Thus, there is provided a flasher for vehicles wherein not only a direction indicating function, including an ability to indicate occurrence of burn-out or breakage (circuit discontinuity) of any one of the flasher lamps, but also a hazard-warning or fault indicating function are realized through a single flasher circuit in which integrated circuits may be readily utilized.

3 Claims, 3 Drawing Figures

PATENTED JAN 9 1973  3,710,183

INVENTORS
Yoshichi Kawashima
Hisami Mitsueda

BY Cushman, Darby & Cushman
ATTORNEYS

FLASHER FOR VEHICLES

BACKGROUND OF THE INVENTION

1. Field of the Invention

The present invention relates to a flasher for vehicles adapted to be mounted on vehicles, chiefly on automobiles, which performs both a direction indicating function and a fault alarm or hazard-warning function to signal that trouble or a mishap has occurred.

2. Description of the Prior Art

In the prior art current-type flashers such as shown in FIG. 1, as a movable electrode 5a of a flasher lamp change-over switch 5 is thrown onto a fixed electrode 5b connected to left turn flasher lamps 1 and 2, current flows into a primary exciting coil 26 and a secondary exciting coil 27 through a normally-closed contact 25 from a battery 24 such that a capacitor 28 is charged with the current flowing through the primary exciting coil 26 and the current flowing through the secondary exciting coil 27 causes the flasher lamps 1 and 2 to go on. In this case, the current flows simultaneously and in the same direction through both of the coils 26 and 27 so that the magnetic flux of these coils cancel each other and thus the normally-closed contact 25 remains in the closed position. However, as the charging of the capacitor 28 proceeds further, the current no longer flows through the primary exciting coil 26 and the normally-closed contact 25 is caused to open by the magnetic attraction of the secondary exciting coil 27. When this happens, no current is supplied from the battery 24 causing the flasher lamps 1 and 2 to go off. The charge in the capacitor 28 is then discharged through a circuit comprising the primary exciting coil 26, secondary exciting coil 27 and the flasher lamps 1 and 2. In this case, the magnetic flux of both said coils 26 and 27 added together produces sufficient magnetic attraction to hold the normally-closed contact 25 open. When the capacitor 28 is completely discharged after a little while, the said magnetic attraction no longer exists, thus causing the normally-closed contact 25 to return to its original closed position after a given time. Repetition of the above described operations causes the left turn flasher lamps 1 and 2 to keep on flashing. On the other hand, it is so arranged that flashing operation of the right turn flasher lamps 3 and 4 may be effected in the same manner as the left turn is made by throwing the movable electrode 5a of the flasher lamp change-over switch 5 onto the fixed electrode 5c. With a voltage-type flasher shown in FIG. 2, it differs from the previously described current-type flasher in that a different secondary exciting coil 27' having a winding which is smaller but of an increased number of turns as compared to that of the secondary exciting coil 27, is connected in parallel with a primary exciting coil 26 and flasher lamps 1, 2, 3 and 4 so that the coil 27' serves only to open and close a normally-closed contact 25 and current is conducted to flasher lamps 1, 2, 3 and 4 through the normally-closed contact 25 and a flasher lamp change-over switch 5.

However, both of these prior art devices have been disadvantageous in that their physical dimensions as a whole tend to be bulky because they both require a capacitor 28 having a large capacitance value as well as two exciting coils 26 and 27 or 26 and 27' which presents a problem wherein it is very difficult to maintain proper contact pressure with respect to the normally-closed contact 25. In addition, there has been a drawback with the FIG. 1 current-type flasher wherein, when the vehicle has gone wrong unexpectedly, any attempt to cause the flashing operation of all the flasher lamps 1, 2, 3 and 4 at the front and rear and on both sides of the vehicle will be in vain, because the lamp current required for this purpose would be twice the current required for turn signal flashing operation and the lamps 1, 2, 3 and 4 may not flash, thus failing to signal that trouble has occurred. Moreover, though the lamp current may flow through the secondary exciting coil 27, only at a certain time after the closing of the normally-closed contact 25 will the flasher lamps 1 and 2 or 3 and 4 go on because the secondary exciting coil 27 has inductance. Therefore, either the lamps 1 and 2 or 3 and 4 will remain in the off-state during this time lag and the flashing operation will start from the off-state. On the other hand, the disadvantage of the latter, i.e., the voltage-type flasher of FIG. 2, has been that as the flashing operation is performed regardless of the capacity of the load, e.g. the number of operable lamps, since the flashing frequency or number of times the flashing operations may take place is constant at all times, which means that it is impossible to signal to the driver the occurrence of a lamp circuit discontinuity problem, for example whenever any one of the flasher lamps 1, 2, 3 and 4 gets out of order due to a burn-out, breakage or for any other reason.

SUMMARY OF THE INVENTION

It is an object of the present invention to provide a flasher for vehicles wherein a transistor switching circuit is driven by the output from a transistor adapted to conduct upon closing of a turn signal or flasher lamp change-over switch or a hazard-warning (trouble) flasher switch, the output from said switching circuit energizing an exciting coil to close a normally-open contact, and flasher lamps are turned on with a lamp current supplied thereto through said normally-open contact, a resistor and said flasher lamp change-over switch or trouble flasher switch.

According to the present invention, greater effectiveness is achieved in the device of the present invention wherein the flashing operations may start without any significant time to the on state, whereas in the conventional current-type flasher, for example, the flashing operations of the turn signal lamps were started from the off state with a significant delay to the on state as the lamp current was supplied through the exciting coils.

Another object of the present invention is to provide, in addition to said flasher for vehicles, a device designed to detect the value of the lamp current by virtue of the voltage drop across said resistor.

According to the present invention, it is possible to detect the presence of a fault in the circuit by means of a change in the voltage drop across the resistor.

Further object of the present invention is to provide a flasher for vehicles wherein said voltage drop is maintained as a bias voltage between the base and emitter of said transistor such that upon occurrence of a fault, the transistor is caused to go on and off to effect the on-off control upon the operation of the transistor switching circuit with an operating cycle faster than is normally attained, whereby the flasher lamps in normal conditions may be caused to go on and off intermittently with a faster cycle than that of the flashing operation under normal operating conditions, thus enabling the driver to recognize that any of a plurality of flasher lamps has gone wrong due to a burn-out or any other reason.

Still further object of the present invention is to provide a flasher for vehicle comprising a current conduction time limiting circuit adapted to determine, with two resistors and a charging time constant of the capacitor, the time during which current flows through the flasher lamps, characterized in that the operation of said transistor switching circuit is interrupted by the output from said time limiting circuit to deenergize the exciting coil to cause the flasher lamps to go off, and the time during which the lamps remain off is determined by the discharging time constant of the one of the two resistors and capacitor in said time limiting circuit.

According to the present invention, all the flasher lamps at the front and rear and on both sides of the vehicle are caused to flash in the same manner as the turn indicating operation by closing the hazard-warning flasher switch. Moreover, since only one exciting coil and a single normally-open contact are required and there is no need for a capacitor having an especially large capacity as described in the above, the device according to the present invention makes it possible to utilize integrated circuits for the flasher circuit. Further, the use of a normally-open contact eliminates any difficulties involved in the adjustment of the contact pressure. These are the remarkable effects attributable to the present invention.

DESCRIPTION OF THE PREFERRED EMBODIMENT

Figure 1:
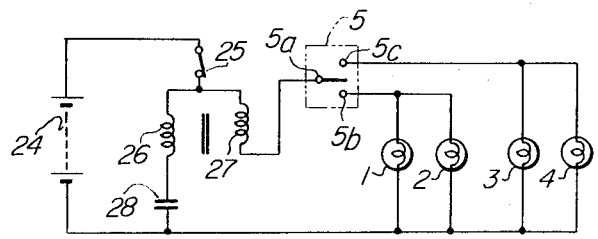
FIG. 1 is a wiring diagram showing a known prior art current-type flasher.
Figure 2:
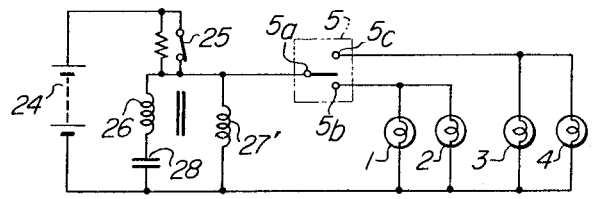
FIG. 2 is a wiring diagram showing a known prior art voltage-type flasher.
Figure 3:
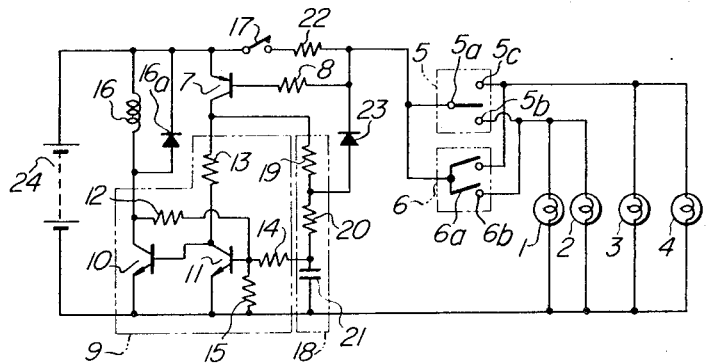
FIG. 3 is a wiring diagram showing an embodiment of the flasher according to the present invention.

The present invention will be explained hereinafter with reference to the illustrated embodiment. Referring to FIG. 3, numerals 1 and 2 designate flasher lamps for a left turn; 3 and 4, flasher lamps for a right turn; 5 a flasher lamp change-over switch of a single-pole double-throw type having a movable electrode 5a and fixed electrodes 5b and 5c. Numeral 6 designates a hazard-warning flasher switch of a double-pole double-throw type having a movable electrode 6a and a fixed electrode 6b. Numeral 7 designates a transistor the base of which receives current through base resistor 8 when either of said switches 5 and 6 is thrown. Numeral 9 designates a transistor amplifier switching circuit; 10 and 11, transistors whose base currents are the collector current of the transistor 7; 12 and 13, load resistors for the transistors 10 and 11 respectively; resistor 12 provides positive feedback from the output of transistor 10 to the input of transistor 11; 14 and 15, the base resistor and the bias resistor between the base and emitter of the transistor 11 respectively. Numeral 16 designates an exciting coil adapted to be energized by the collector current of the transistor 10 to close a normally-open contact 17; 16a, a diode to absorb the counter electromotive force generated in the exciting coil 16. Numeral 18 designates a current conduction time limiting circuit adapted to delay the application of current to the base of the transistor 11 from the collector of the transistor 7 by a time determined by the charging time constant of resistors 19 and 20 and a capacitor 21. Numeral 22 designates a resistor connected between the base and emitter of the transistor 7, the resistor being located in a lamp circuit. Numeral 23 designates a diode forming a charging circuit for the capacitor 21. Numeral 24 designates a battery installed in the vehicle.

With the construction described above, the operation of the device according to the present invention will be described hereinafter. Now, assuming the movable electrode 5a of the flasher lamp change-over switch 5 is thrown onto the fixed electrode 5b with the intention of turning the vehicle to the left, this causes the transistor 7 to conduct as its base is caused to be grounded through the resistor 8, the change-over switch 5 and the flasher lamps 1 and 2. When this happens, the collector current of the transistor 7 is caused to flow to the base of the transistor 10 through the resistor 13, permitting the transistor 10 to conduct. On the other hand, the collector current of the transistor 7 also tends to flow to the base of the transistor 11 through the resistors 19 and 20; but this does not take place immediately and the collector current charges the capacitor 21 in the first place. With the transistor 10 now conducting, the collector current thereof energizes the exciting coil 16 to close the normally-open contact 17. As a result, a lamp current is supplied to the flasher lamps 1 and 2 from the battery 24 through the normally-open contact 17, resistor 22 and flash lamp change-over switch 5, causing the lamps 1 and 2 to go on. At the instant that the lamp current flows, the potential at the base of the transistor 7 is caused to rise; however, due to the fact that the voltage drop across the resistor 22 inserted in the lamp circuit serves as a bias voltage between the base and emitter of the transistor 7, the transistor 7 remains in its conductive state, thus keeping the flasher lamps 1 and 2 alight. In the meantime, the capacitor 21 continues to charge up until its terminal voltage reaches a point at which conduction is caused between the base and emitter of the transistor 11. This causes the transistor 11 to conduct and the transistor 10 to be cut off, whereupon the exciting coil 16 is de-energized to open the normally-open contact 17. The flasher lamps 1 and 2 are thus caused to be extinguished and the potential at the base of transistor 7 falls again. The time interval during which the lamps 1 and 2 remain off lasts until the charge in the capacitor 21 is discharged through the resistor 20, diode 23, switch 5 and the lamps sufficiently that the capacitor terminal voltage drops below the cut-off base voltage of the transistor 11. When transistor 11 is cut off, transistor 10 is caused to be conductive again. In other words, the duration of the lighted period is determined by the charging timed constant of the resistors 19 and 20 and the capacitor 21, while the duration of the off period is determined by the discharging time constant of the resistor 20 and the capacitor 21. Thereafter, repetition of the above described process of operations causes the left turn flasher lamps 1 and 2 to go on and off intermittently.

On the other hand, if a right turn is to be made, the movable electrode 5a of the flasher lamp change-over switch 5 is thrown onto the fixed electrode 5c so that the right turn flasher lamps 3 and 4 are caused to flash in the same fashion as is the case with the left turn.

In the flashing operations described above, for example, if any one of the left turn flasher lamps goes wrong due to a burn-out or the like, this results in a decreased lamp current which in turn causes a decrease in the value of the voltage drop across the resistor 22. When this happens, it is no longer possible to provide the bias voltage between the base and emitter of the transistor 7 which maintains the transistor 7 in its conducting state. Thus, the transistor 7 is rapidly cut off opening the normally-open contact 17 to cause the normal flasher lamp 1 or 2 to go off. However, the transistor 7 is caused to conduct again as the base current path is still maintained through the flasher lamp change-over switch 5 and any one of the flasher lamps 1 and 2. Thereafter, the normal flasher lamp repeats its flashing operation at very short periods as compared to flashing operations under the normal conditions. This enables the driver to perceive that any one of the flasher lamps 1 and 2 has gone wrong. That is, the trouble signaling operation described above may be effected by detecting a change caused in the lamp current by the burnt-out flasher lamp 1 or 2 in terms of a change in the voltage drop across the resistor 22. Further, the above flashing periods may be changed by altering the ohmic values of the resistors 8, 13 and 22.

Any trouble caused by a burn-out of the right turn flasher lamps 3 and 4 may be detected in a similar manner as the left turn flasher lamps 1 and 2.

On the other hand, if something has gone wrong with the vehicle and the trouble has to be indicated, the movable electrode 6a of the all-lamp flasher switch 6 is thrown onto the fixed electrode 6b so that all the flasher lamps 1, 2, 3 and 4 at the front and rear and on both sides of the vehicle are caused to flash in the same manner as in the case of turn signaling operations. In this way, the driver may signal the drivers of other vehicles that his vehicle is in difficulties.

We claim:

1. A signal lamp flasher for use with vehicles having an electric power source and a plurality of signal lamps connected to parallel connected turn signal and hazard warning switches, comprising:

a series connection having first and second opposite ends between which are serially connected a normally off switching device and resistor means, means for connecting said first end of said series connection directly to said power source and means for connecting said second end of said series connection to said turn signal and hazard warning switches and a return circuit to said power source, a transistor having an output terminal for delivering an output current when the transistor is conductive and having biasing means and two other terminals with one of said two other terminals being connected to said first end of said series connection and said biasing means being connected between the other of said two other terminals and said second end of said series connection for biasing said transistor to conduction whether or not said switching device is off, a normally non-conductive transistor switching circuit having an output and having first and second inputs and a common terminal, said first input of said transistor switching circuit being connected to said transistor output terminal for receiving said transistor output current without substantial delay and switching said switching circuit from non-conduction to conduction and from conduction to non-conduction upon cessation of said transistor output current, means for connecting said common terminal to said return circuit, means connected between said transistor switching circuit output and said switching device for switching said switching device on when said switching circuit is switched to conduction and for switching said switching device off when said switching circuit is non-conductive, and timing circuit means connected to said transistor output terminal for deriving from said transistor output current and delivering to said second input of said transistor switching circuit at a predetermined delayed time a signal for switching said transistor switching circuit back to non-conduction, and thereby said switching device to off as aforesaid, said resistor means in said series connection being operative as an addition biasing means for said transistor when said serially connected switching device is closed so that when a said lamp is burned out less lamp current passes through said resistor means and said transistor consequently becomes non-conductive immediately and switches off said transistor switching circuit and said switching device immediately rather than after said predetermined delay time.

2. A flasher as in claim 1 wherein said timing circuit means includes first and second resistors and a capacitor all serially connected in the order stated, the first resistor being connected at its free end to said transistor output terminal and the junction between the second resistor and the capacitor being connected to said second input of said transistor switching circuit, the junction between the first and second resistors being uni-directionally connected to the said second end of said series connection, whereby the said predetermined delay time is determined by both of said first and second resistors in conjunction with said capacitor while the capacitor is being charged by said transistor output current, and only said second resistor in conjunction with the capacitor determines the discharge time of the capacitor and thereby the cessation time of said signal for returning said transistor switching circuit to conduction.

3. A flasher as in claim 1, in combination with said electric power source and said plurality of said signal lamps and said turn signal and hazard warning switches, said switches being connected in parallel between said signal lamps and the said second end of said series connection and said power source being connected directly to said first end of said series connection and to said transistor for switching said transistor switching circuit to conduction only when said transistor is conductive.

* * * * *